US007623419B2

(12) United States Patent
Nakata

(10) Patent No.: US 7,623,419 B2
(45) Date of Patent: Nov. 24, 2009

(54) METHOD AND APPARATUS FOR MEASURING OFF-TRACK DETECTION SENSITIVITY

(75) Inventor: Yasuo Nakata, Hirakata (JP)

(73) Assignee: Panasonic Corporation, Osaka (JP)

(*) Notice: Subject to any disclaimer, the term of this patent is extended or adjusted under 35 U.S.C. 154(b) by 927 days.

(21) Appl. No.: 10/768,623

(22) Filed: Jan. 30, 2004

(65) Prior Publication Data
US 2004/0208099 A1 Oct. 21, 2004

(30) Foreign Application Priority Data
Jan. 31, 2003 (JP) ............... 2003-024033

(51) Int. Cl.
*G11B 7/085* (2006.01)
(52) U.S. Cl. ............... 369/44.28; 369/53.23
(58) Field of Classification Search .......... 369/30.13, 369/44.25, 44.27–44.29, 53.15, 53.28, 53.22–53.23; 360/77.01
See application file for complete search history.

(56) References Cited

U.S. PATENT DOCUMENTS

| 5,703,848 | A | * | 12/1997 | Hofer ............ 369/44.29 |
| 5,926,337 | A | | 7/1999 | Itou et al. |
| 6,167,011 | A | * | 12/2000 | Sun et al. ............ 369/44.41 |
| 6,272,089 | B1 | * | 8/2001 | Kato ............ 369/53.41 |
| 6,633,521 | B1 | * | 10/2003 | Mochizuki et al. ....... 369/44.29 |
| 6,707,630 | B2 | * | 3/2004 | Doi et al. ............ 360/69 |
| 6,774,615 | B2 | * | 8/2004 | Yoshida et al. ............ 324/76.48 |
| 2003/0128639 | A1 | * | 7/2003 | Kikuchi et al. ............ 369/44.29 |

FOREIGN PATENT DOCUMENTS

| JP | 63-061428 | 3/1988 |
| JP | 09-219027 | 8/1997 |
| JP | 2002251752 | 9/2002 |

OTHER PUBLICATIONS

Japanese Office action dated Mar. 17, 2009 from Japanese Application No. 2002-021638 (4 pages).

* cited by examiner

*Primary Examiner*—Andrea L Wellington
*Assistant Examiner*—Nathan Danielsen
(74) *Attorney, Agent, or Firm*—Marjama Muldoon Blasiak & Sullivan, LLP

(57) ABSTRACT

An off-track duty measurement unit measures off-track detection sensitivity on the basis of an off-track signal, and track cross cycle information that is obtained from a tracking error signal measured by a track cross cycle measurement unit, whereby off-track detection sensitivity can be measured more accurately. Further, an off-track detection sensitivity controller changes the detection sensitivity of an off-track signal detector according to the obtained off-track detection sensitivity, whereby the off-track sensitivity can be kept constant for various kinds of discs, and accordingly, stabilities of off-track detection, track pull-in judgement, and track jumping can be secured.

2 Claims, 14 Drawing Sheets

METHOD AND APPARATUS FOR MEASURING OFF-TRACK DETECTION SENSITIVITY

FIELD OF THE INVENTION

The present invention relates to a signal processing device, a semiconductor device, and a signal processing method and, more particularly, to those optimized so that accurate measurement of an off-track signal becomes possible by measuring the detection sensitivity of the off-track signal in a disc system such as an optical disc device.

BACKGROUND OF THE INVENTION

In a disc system, in order to play information recorded on an optical disc, the optical disc is irradiated with a laser beam, and reflected light is detected. In present optical disc devices, particularly DVD players and the like, it is necessary to play, by a single player, as many discs as possible among existing various kinds of discs such as single-layer DVD, double-layer DVD, DVD-RAM, DVD-R, DVD+R, DVD-RW, DVD+RW, CD-DA, CD-ROM, CD-R, and CD-RW. Therefore, it is necessary to recognize the type of disc at startup of the optical disc system or at disc change, and optimize the system setting according to the disc type for speedy playback.

There are established standards for DVDs and CDs, and it is desired that disc carriers are manufactured within the standards. Under present circumstances, however, discs out of the standards are also distributed due to variations in manufacturing process or the like. Especially, the detection sensitivity of an off-track signal is greatly affected by a difference in modulation degrees of playback signals due to a difference in track pitches or a difference in reflectivities, and therefore, there appear some discs that are inapplicable to the conventional system in which the off-track sensitivity is fixed.

FIG. 6 is a block diagram illustrating a conventional optical disc device of this type. In FIG. 6, reference numeral 1 denotes an optical disc as a data recording medium on which an information signal is recorded on a spiral track or a concentric track. Reference numeral 2 denotes a rotation driver for rotary-driving the optical disc 1; numeral 3 denotes an optical pickup for forming a light spot by focusing a light beam on an information surface of the optical disc, and detecting the reflected light beam, thereby to output various kinds of information; numeral 4 denotes a tracking actuator for moving the optical pickup 3 in the direction of the radius of the optical disc 1; numeral 5 denotes a tracking driver for driving the tracking actuator 4 on the basis of the output of a tracking controller 7; numeral 6 denotes a tracking error signal detector for generating a tracking error signal indicating a deviation of the optical pickup 3 from the track, on the basis of the output of the optical pickup 3; numeral 7 denotes a tracking controller for controlling the tracking driver 5 on the basis of the output of the tracking error signal detector 6 or an off-track signal detector 11; numeral 8 denotes a sled controller for controlling a sled driver 9 on the basis of the output of the tracking error signal detector 6; numeral 9 denotes a sled driver for driving a sled motor 10 on the basis of the output of the sled controller 8; numeral 10 denotes a sled motor for moving the optical pickup 3 on the basis of the output of the sled driver 9; and numeral 11 denotes an off-track signal detector for detecting an off-track signal indicating that the optical pickup 3 is off the track, on the basis of the output of the optical pickup 3.

Hereinafter, the operation of the conventional optical disc device constituted as mentioned above will be described.

When performing disc playback, the tracking error signal detector 6 detects a tracking error signal on the basis of the output of the optical pickup 3. Then, the tracking controller 7 performs processing for stabilizing tracking servo on the basis of the obtained tracking error signal, and the tracking driver 5 drives the tracking actuator 4 to execute tracking servo so that the actuator 4 follows the track.

Since the movable range of the optical pickup 3 in the disc radius direction is narrow, sled control is carried out to compensate for it. That is, the sled controller 8 obtains an output according to a deviation, i.e., a displacement in the disc radius direction, on the basis of the output of the tracking error signal detector 6, and the sled driver 9 drives the sled motor 10 on the basis of the deviation so as to cancel the deviation.

Further, in the conventional optical disc device, the off-track signal obtained by the off-track signal detector 11 is used for judgement on off-track due to vibration, or track pull-in, and detection of track cross direction at accessing. When this off-track signal is used for recovery of off-tracking, it is output to the tracking controller 7, and the tracking controller 7 outputs a control signal for compensating the off-tracking to the tracking driver 5, whereby the tracking actuator 4 drives the optical pickup 3 so as to put the optical pickup 3 back to the original track.

An off-track signal generation method by the off-track signal detector 1 will be described with reference to FIGS. 7(*a*) and 7(*b*). FIGS. 7(*a*) and 7(*b*) are schematic diagrams illustrating waveforms obtained when the optical pickup 3 crosses the track. FIG. 7(*a*) shows an optical disc playback signal obtained by the optical pickup 3, and an off-track signal generated by the playback signal. Generation of the off-track signal is as follows. That is, as shown in FIG. 7(*a*), a lower envelope signal e of the playback signal is compared with a reference signal r indicated by a broken line, and an off-track signal as shown in FIG. 7(*a*) is generated according to the comparison result.

Generally, utilizing "hollows" in the playback signal which are generated when the optical pickup 3 crosses the track, i.e., portions where the lower envelope signal e of the playback signal is convex upward, portions where the lower envelope signal exceeds a reference value of the reference signal r are regarded as "high" while portions lower than the reference value are regarded as "low", thereby generating an off-track signal. As described above, the condition of the playback signal when the optical pickup 3 crosses the track depends on the disc carrier, and further, the degree of demodulation also varies depending on the track cross speed. FIG. 7(*b*) shows a waveform in which "hollows" in the playback signal at track crossing are relatively small, indicating that the output sensitivity of the off-track signal shown in FIG. 7(*b*) becomes lower than that shown in FIG. 7(*a*).

Particularly, the off-track sensitivity is significantly affected by crosstalk, i.e., interference with an adjacent track, which is caused by a narrow track pitch or a pit formation defect. Since the off-track signal is used for off-track detection and track pull-in judgement as described above, if the off-track signal cannot be normally detected, false judgement might be made on track following, whereby stability of the system is lost.

In order to solve these problems, various kinds of off-track signal detectors have already been developed.

FIG. 8 is a block diagram illustrating a conventional off-track signal detector disclosed in Japanese Published Patent Application No. Hei. 9-219027. FIG. 9 shows operation waveforms thereof.

In FIG. 8, a track error signal 104 is at zero level in the center of a track formed on an optical disc, and the error signal increases in the positive or negative direction with decreasing proximity to the center of the track.

A zero-cross detection circuit 105 detects a zero cross of the track error signal 104 to generate a zero-cross pulse 106. A sample/hold control circuit 107 controls the sample/hold timings of a peak level sample/hold circuit 110 and a bottom level sample/hold circuit 111 by using the zero-cross pulse 106.

As shown in FIG. 9, the track error signal 104 attains a zero level and an optical detector sum signal 101 attains a low level in a groove section in the center of a track on the optical disc, and the track error signal attains a zero level and the optical detector sum signal 101 attains a high level in a land section at the boundary between a track and an adjacent track. Accordingly, it is possible to detect a peak level and a bottom level of the optical detector sum signal 101 by detecting a zero cross of the track error signal 104 and sampling/holding the optical detector sum signal 101 at that timing.

When a zero cross of the track error signal 104 is detected, judgement as to which of peak and bottom is to be sampled/held is carried out using the off-track signal. That is, the sample/hold control circuit 107 detects a zero cross pulse 106 of the track error signal 104, and outputs a bottom sample/hold pulse 109 when the off-track signal 103 at this time is low (on-track state), and outputs a peak sample/hold pulse 108 when the off-track signal 103 is high (off-track state). Thereby, the peak level sample/hold circuit 110 detects an optical detector sum signal peak level 112 of the optical detector sum signal 101, while the bottom level sample/hold circuit 111 detects an optical detector sum signal bottom level 113 of the optical detector sum signal 101, and an intermediate level generation circuit 114 generates an intermediate level between the optical detector sum signal peak level 112 and the optical detector sum signal bottom level 113. A comparator 102 compares the optical detector sum signal 101 with the intermediate level as a reference value, and outputs an off-track signal 103 according to the comparison result.

However, even the off-track detection circuit disclosed in Japanese Published Patent Application No. Hei. 9-219027 cannot accurately detect off-track signals from all kinds of optical discs, and it is unavoidable that different sensitivities are provided for different discs. As a result, it is difficult to obtain a stable off-track sensitivity of the system.

As described above, in the conventional disc system, it is difficult to keep the off-track sensitivity constant for various kinds of discs, and accordingly, it is difficult to secure stabilities of off-track detection and track pull-in judgement.

SUMMARY OF THE INVENTION

The present invention is made to solve the above-described problems and has for its object to provide a signal processing device, a semiconductor device and a signal processing method which can keep the off-track sensitivity constant for each disc, and thereby can secure stabilities of off-track detection and track pull-in judgement also for discs out of standards.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a signal processing device comprising: a track cross cycle measurement unit for receiving a tracking error signal showing a degree of deviation of a playback unit for playing data recorded on a recording medium from a track formed on the recording medium, and measuring a track cross cycle that is a cycle with which the playback unit crosses the track, on the basis of the tracking error signal; an off-track signal detector for detecting an off-track signal indicating that the playback unit is off the track; and an off-track detection sensitivity measurement unit for measuring the off-track detection sensitivity that is the frequency of occurrence of the off-track signal within a predetermined measurement period, on the basis of the off-track signal. Therefore, it is possible to accurately measure the off-track detection sensitivity.

According to a second aspect of the present invention, in the signal processing device according to the first aspect, the off-track detection sensitivity measurement unit measures the off-track detection sensitivity in units of track cross cycles of the tracking error signal. Therefore, it is possible to accurately measure the off-track detection sensitivity on the basis of the data during a period of the track cross cycle that is the smallest unit for measuring the off-track detection sensitivity.

According to a third aspect of the present invention, in the signal processing device according to the first or second aspect, the off-track detection sensitivity measurement performs measurement only when the track cross cycle of the tracking error signal is within a predetermined cycle range. Therefore, data obtained when the track cross speed is low or high can be discarded, resulting in more accurate off-track detection sensitivity measurement.

According to a fourth aspect of the present invention, in the signal processing device according to the third aspect, the predetermined cycle range includes a track cross cycle at the time of track jumping in which the playback unit moves to another track. Therefore, track jumping at which track cross surely occurs can be included in the period of performing off-track detection sensitivity measurement, resulting in increased reliability in off-track detection sensitivity measurement at track jumping.

According to a fifth aspect of the present invention, the signal processing device according to any of the first to third aspects further comprises a defect detector for detecting whether there is a defect on the recording medium or not, and the off-track detection sensitivity measurement unit discards the measured value when a defect on the recording medium is detected. Therefore, it is possible to measure the off-track detection sensitivity without using measured data of low reliability due to flaws or defects on the disc surface, resulting in further increased reliability in off-track detection sensitivity measurement.

According to a sixth aspect of the present invention, in the signal processing device according to the fifth aspect, when a defect on the recording medium is detected, the measured value within the track cross cycle including the defect detection time is discarded. Therefore, it is possible to measure the off-track detection sensitivity without using measured values during track cross cycles in a period including measured data of low reliability due to flaws or defects on the disc surface, resulting in further increased reliability in off-track detection sensitivity measurement.

According to a seventh aspect of the present invention, in the signal processing device according to any of the first to sixth aspects, the detection sensitivity of the off-track signal detector is variable, and the signal processing device further comprises an off-track detection sensitivity controller for controlling the detection sensitivity of the off-track signal detector on the basis of the off-track detection sensitivity that is measured by the off-track detection sensitivity measurement unit. Therefore, it is possible to control off-track detection sensitivity of the off-track signal detector according to the measured off-track detection sensitivity, resulting in more accurate off-track detection sensitivity measurement, and constant off-track sensitivity for various kinds of recording media.

According to an eighth aspect of the present invention, in the signal processing device according to the seventh aspect, the off-track detection sensitivity controller sets, separately, an off-track detection sensitivity at the time of track jumping when the playback unit moves to another track, and an off-track detection sensitivity at the time of track tracing when the playback unit follows the track. Therefore, it is possible to set off-track sensitivity at track jumping and that at track tracing separately.

According to a ninth aspect of the present invention, the signal processing device according to any of the first to eighth aspects further comprises a tracking driver for moving the playback unit for playing the data recorded on the recording medium in the direction of the radius of the recording medium; a sled driver for moving the playback unit; and a system controller for controlling the respective components; and the system controller controls the tracking driver and the sled driver, and measures the off-track detection sensitivity while moving or vibrating the playback unit in the direction in which the playback unit crosses the track. Therefore, it is possible to measure the off-track detection sensitivity by raising track cross by moving or vibrating the playback unit for a recording medium on which track eccentricity hardly exists.

According to a tenth aspect of the present invention, in the signal processing device according to the ninth aspect, the system controller performs control so that the track cross cycle becomes a predetermined range. Therefore, it is possible to measure the off-track detection sensitivity more accurately by raising track cross by moving or vibrating the playback unit at an appropriate speed for a recording medium on which track eccentricity hardly exists.

According to an eleventh aspect of the present invention, in the signal processing device according to the ninth or tenth aspect, the track cross cycle measurement unit gives the measured track cross cycle to the tracking driver and the sled controller. Therefore, it is possible to perform speed control at moving the playback unit.

According to a twelfth aspect of the present invention, there is provided a semiconductor device comprising: a track cross cycle measurement unit for receiving a tracking error signal showing a degree of deviation of a playback unit for playing data recorded on a recording medium from a track formed on the recording medium, and measuring a track cross cycle that is a cycle with which the playback unit crosses the track, on the basis of the tracking error signal; and an off-track detection sensitivity measurement unit for measuring the off-track detection sensitivity that is the frequency of occurrence of the off-track signal within a predetermined measurement period, on the basis of an off-track signal indicating that the playback unit is off the track; and the off-track detection sensitivity measurement unit measures the off-track detection sensitivity in units of track cross cycles of the tracking error signal. Therefore, it is possible to accurately measure the off-track detection sensitivity on the basis of the data during a period of the track cross cycle that is the smallest unit for measuring the off-track detection sensitivity.

According to a thirteenth aspect of the present invention, there is provided a signal processing method comprising: a track cross cycle measurement step of receiving a tracking error signal showing a degree of deviation of a playback unit for playing data recorded on a recording medium from a track formed on the recording medium, and measuring a track cross cycle that is a cycle with which the playback unit crosses the track, on the basis of the tracking error signal; an off-track signal detection step of detecting an off-track signal indicating that the playback unit is off the track; and an off-track detection sensitivity measurement step of measuring the off-track detection sensitivity that is the frequency of occurrence of the off-track signal within a predetermined measurement period, on the basis of the off-track signal. Therefore, it is possible to accurately measure the off-track detection sensitivity.

According to a fourteenth aspect of the present invention, the signal processing method according to the thirteenth aspect further includes a defect detection step of detecting whether there is a defect on the recording medium or not; and the off-track detection sensitivity step discards the measured value when a defect on the recording medium is detected. Therefore, it is possible to measure the off-track detection sensitivity without using measured data of low reliability due to flaws or defects on the disc surface, resulting in further increased reliability in off-track detection sensitivity measurement.

According to a fifteenth aspect of the present invention, in the signal processing method according to the thirteenth or fourteenth aspect, the detection sensitivity of the off-track signal detection step is variable; and the detection sensitivity of the off-track signal detection step is controlled according to the off-track detection sensitivity measured in the off-track detection sensitivity measurement step. Therefore, it is possible to control the detection sensitivity of the off-track signal detector according to the measured off-track detection sensitivity, resulting in more accurate off-track detection sensitivity measurement, and constant off-track sensitivity for various kinds of recording media.

DETAILED DESCRIPTION OF THE INVENTION

The present invention is not intended for improvement of detection accuracy of an off-track signal detector itself, but it is intended for more accurate measurement of off-track sensitivity by measuring off-track detection sensitivity and controlling sensitivity of the off-track signal detector according to the measurement result, thereby to secure system stabilities of off-track detection, track pull-in judgement, and the like.

That is, off-track detection sensitivity is measured by an off-track detection sensitivity measurement unit on the basis of track crossing cycle information that is obtained from a tracking error signal by an off-track signal processing unit and a track cross cycle measurement unit, thereby to accurately measure off-track detection sensitivity.

Furthermore, tracking control and sled control are carried out on the basis of information obtained by a tracking error signal detector and a track cross cycle detector to measure off-track detection sensitivity, whereby off-track detection sensitivity can be measured more accurately and speed control can be realized.

On the basis of the off-track detection sensitivity so obtained, an off-track controller changes the sensitivity of the off-track signal detector, whereby the off-track sensitivity can be kept constant for various kinds of discs, and system stabilities of off-track detection and track pull-in judgement can be secured.

Hereinafter, embodiments of the present invention will be described with reference to FIGS. 1 to 5.

Embodiment 1

In a first embodiment of the present invention, off-track duty is detected, and off-track detection sensitivity is adjusted on the basis of the detection result, whereby off-track detection sensitivity for adjusting the off-track detection sensitivity according to various kinds of discs can be measured, and further, the off-track detection sensitivity can be controlled using the measurement result.

Figure 1A:
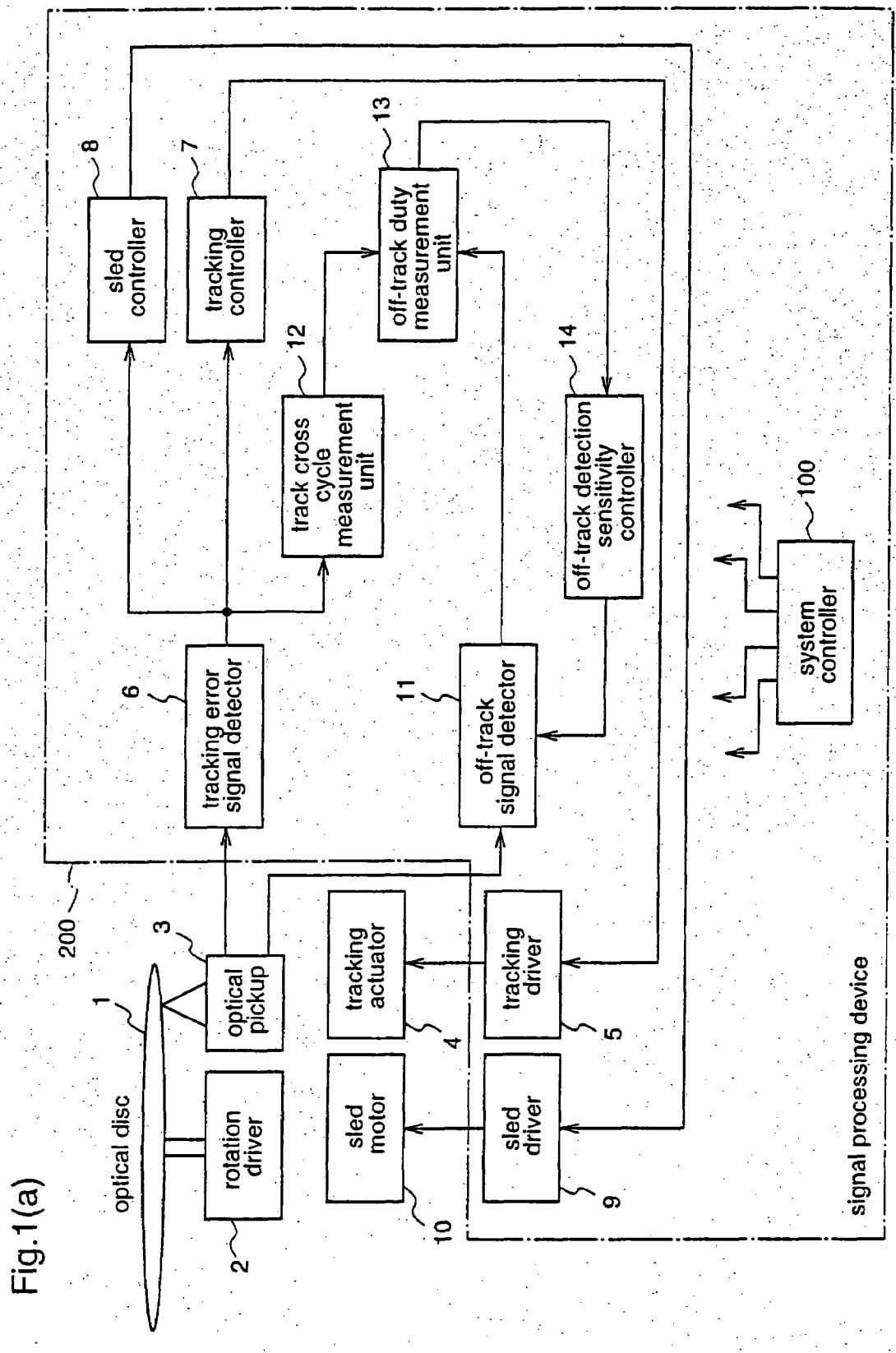
FIG. 1(a) is a block diagram illustrating the construction of an optical disc device having a signal processing device according to a first embodiment of the present invention.

FIG. 1(a) is a block diagram illustrating an optical disc device having a signal processing device according to a first embodiment of the present invention. In FIG. 1(a), reference numeral denotes an optical disc as a data storage medium in which an information signal is recorded on spiral or concentric tracks; numeral 2 denotes a rotation driver for rotary-driving the optical disc 1; numeral 3 denotes an optical pickup as a playback unit for forming a light spot by focusing a light beam on an information surface of the optical disc, and detecting a light beam reflected from the light spot to output various kinds of information; numeral 4 denotes a tracking actuator for moving the optical pickup 3 in the direction of the radius of the optical disc 1; numeral 5 denotes a tracking driver for driving the tracking actuator 4; numeral 6 denotes a tracking error signal detector for generating a tracking error signal indicating a deviation of the optical pickup 3 from the track, on the basis of the output of the optical pickup 3; numeral 7 denotes a tracking controller for controlling the tracking drive unit 5 on the basis of the output of the tracking error signal detector 6; numeral 8 denotes a sled controller for controlling a sled driver 9 on the basis of the output of the tracking error signal detector 6; numeral 9 denotes a sled driver for driving a sled motor 10 on the basis of the output of the sled controller 8; numeral 10 denotes a sled motor for moving the optical pickup 3 on the basis of the output of the sled driver 9; numeral 11 denotes an off-track signal detector for detecting an off-track signal indicating that the optical pickup 3 is off the track, with sensitivity according to the output of an off-track detection sensitivity controller 14, on the basis of the output of the optical pickup 3; numeral 12 denotes a track cross cycle measurement unit for measuring a track cross cycle on the basis of the tracking error signal obtained by the tracking error signal detector 6; numeral 13 denotes an off-track duty measurement unit (off-track detection sensitivity measurement unit) for measuring an off-track duty as an off-track detection sensitivity on the basis of the information obtained by the off-track signal detector 11 and the track cross cycle measurement unit 12; and numeral 14 denotes an off-track detection sensitivity controller for controlling the off-track detection sensitivity on the basis of the information obtained by the off-track duty measurement unit 13.

Further, reference numeral 100 denotes a system controller for controlling the tracking driver 5, the sled driver 9, the track cross cycle measurement unit 12, and the off-track duty measurement unit 13. Reference numeral 200 denotes a signal processing device comprising the tracking error signal detector 6, the tracking controller 7, the sled controller 8, the tracking driver 5, the sled driver 9, the off-track signal detector 11, the track cross cycle measurement unit 12, the off-track duty measurement unit 13, the off-track detection sensitivity controller 14, and the system controller 100.

Figure 6:
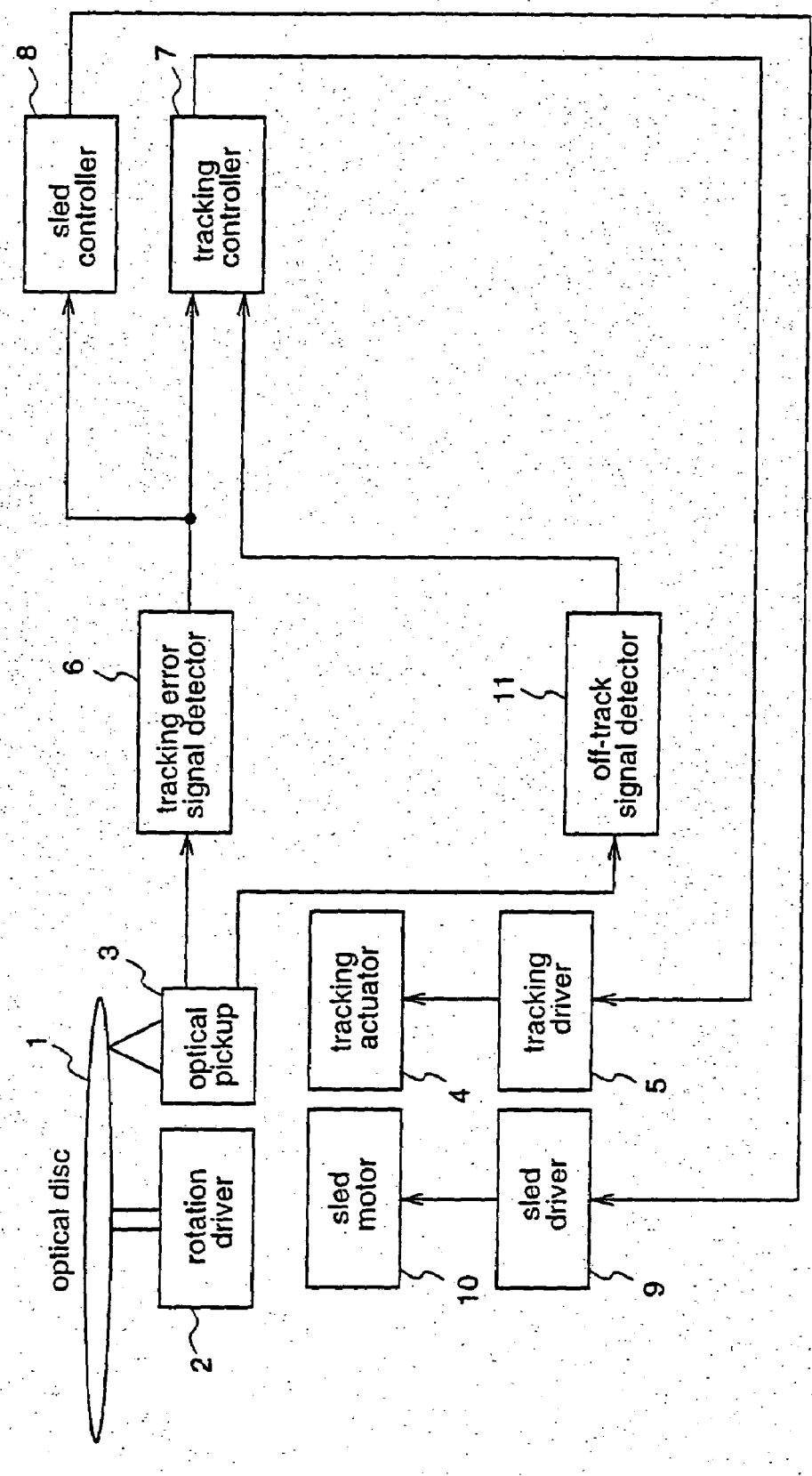
FIG. 6 is a block diagram illustrating the construction of a conventional optical disc device.

The device according to the first embodiment is obtained by adding a semiconductor device comprising the track cross cycle measurement unit 12 and the off-track duty measurement unit 13, and the off-track detection sensitivity controller 14, to the constituents of the conventional device shown in FIG. 6, and the output signal from the off-track signal detector 11 is given to the off-track duty measurement unit 13.

Figure 1B:
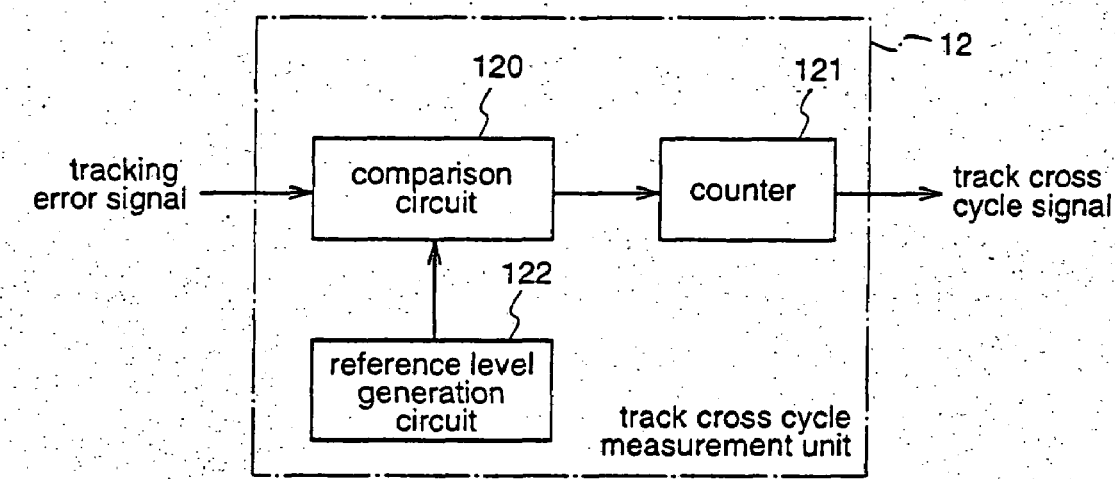
FIG. 1(b) is a block diagram illustrating the construction of a track cross cycle measurement unit shown in FIG. 1(a).

Among the constituents of the signal processing device, the track cross cycle measurement unit 12 compares the tracking error signal with a reference level to detect "high" and "low" sections, and counts the cycles of the "high" and "low" sections, thereby counting the track cross cycle. FIG. 1(b) shows an example of the construction of the track cross cycle measurement unit 12. In FIG. 1(b), reference numeral 122 denotes a reference level generation circuit for generating a reference level, numeral 120 denotes a comparison circuit for comparing the reference level and the tracking error signal to detect "high" and "low" sections, and numeral 121 denotes a counter for counting the cycles of the "high" and "low" sections to output a track cross cycle signal.

Figure 1C:
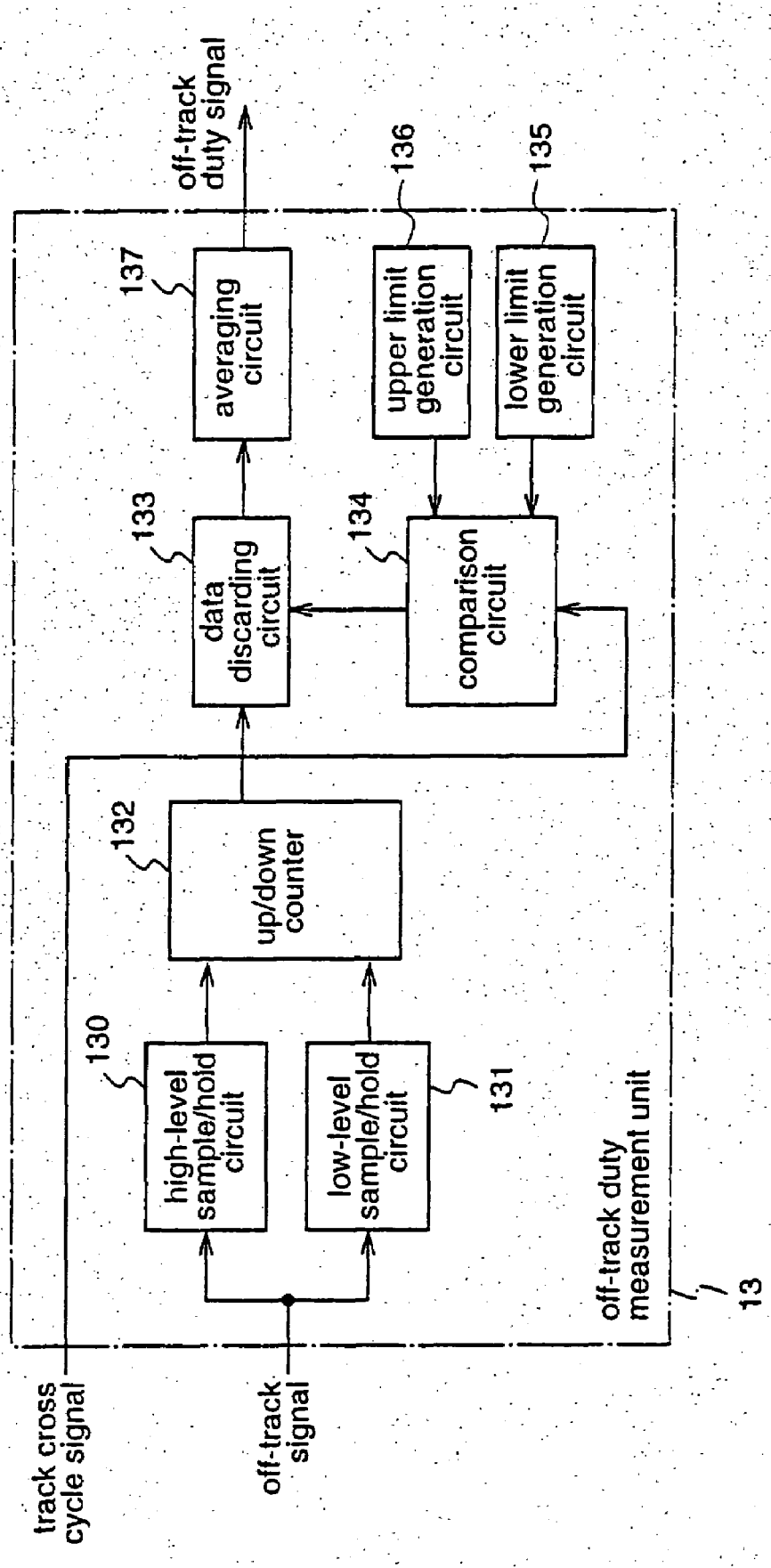
FIG. 1(c) is a block diagram illustrating the construction of an off-track duty measurement unit shown in FIG. 1(a).

Further, the off-track duty measurement unit 13 samples the high and low levels of the off-track signal from the off-track signal detector 11, and detects off-track duty by measuring the ratio of the high levels to the low levels by using an up/down counter or the like. FIG. 1(c) shows an example of construction of the off-track duty measurement unit 13. In FIG. 11(c), reference numerals 130 and 131 denote a high-level sample/hold circuit and a low-level sample/hold circuit for sampling the high levels and the low levels of the off-track signal, respectively; numeral 132 denotes an up/down counter for performing up count and down count in the high level and low level periods; numeral 134 denotes a comparison circuit for comparing an upper-limit value and a lower-limit value which are generated by an upper-limit value generation circuit 136 and a lower-limit value generation circuit 135, respectively, with the track cross cycle signal to judge whether the value of the track cross cycle signal is within a predetermined range or not; numeral 133 denotes a data discarding circuit for enabling the output of the up/down counter 132 when the value of the track cross cycle signal is within the predetermined range, and discarding the output of the up/down counter 132 when the value of the track cross cycle signal is out of the predetermined range; and reference numeral 137 denotes an averaging circuit for averaging the output signals from the data discarding circuit 133 to output an off-track duty signal.

Figure 1D:
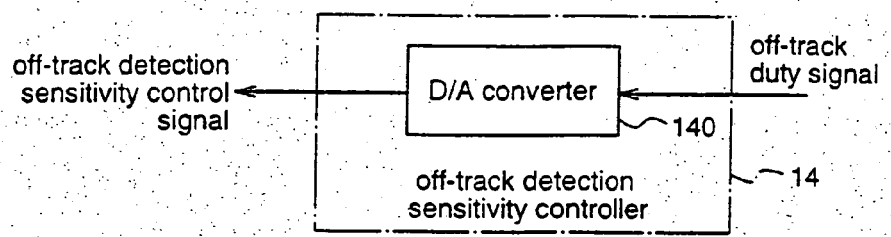
FIG. 1(d) is a block diagram illustrating the construction of an off-track detection sensitivity controller shown in FIG. 1(a).
Figure 7A:
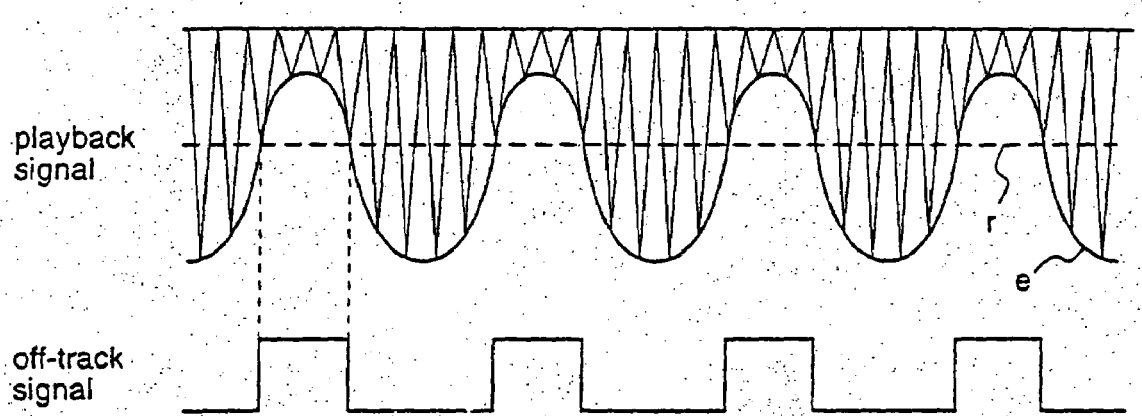
FIG. 7(a) is a waveform diagram for explaining an off-track signal generation method of the conventional optical disc device.

Furthermore, the off-track detection sensitivity controller 14 D/A converts the value, which is measured by the off-track duty measurement unit 13, using the D/A converter 140 as shown in FIG. 1(d), and sends the converted value to the off-track signal detector 11 to raise or lower the level of the reference signal r that is shown by the dotted line, in FIG. 7(a), thereby performing off-track detection sensitivity control for the off-track signal detector 11.

Next, the operation will be described. With respect to the operation that has already described for the prior art shown in FIG. 6, repeated description is not necessary.

Initially, during normal operation, the tracking controller 7 and the sled controller 8 are in their operating states under control of the system controller 100, and tracking servo is turned on, i.e., tracking control is executed, by the tracking controller 7 and the sled controller 8.

On the other hand, during off-track duty measurement, both of the tracking controller 7 and the sled controller 8 are in their non-operating states except when the optical pickup 3 is moved or vibrated, and off-track duty is measured.

The reason is as follows. When sufficient eccentricity of the spiral track exists on the optical disc, the optical pickup crosses the track by only rotating the optical disc with the optical pickup being fixed, thereby enabling measurement of off-track duty. However, in order to make the optical pickup cross the track when track eccentricity hardly exists on the optical disc, the optical pickup must be intentionally moved or vibrated.

When measuring the off-track detection sensitivity by the device shown in FIG. 1, the off-track duty measurement unit 13 measures the track cross cycle on the basis of both the track cross signal and the track cross cycle information which are obtained by the track cross cycle measurement unit 12 in the state where the optical pickup 3 crosses the track. When the track cross cycle is within a predetermined range, the data measured within the cycle is employed. When it is out of the predetermined range, the data measured within the cycle is discarded. In this way, the off-track signal is integrated while taking or discarding the measured data, and the measured values are averaged according to the measurement period, thereby to obtain off-track detection sensitivity, i.e., the frequency of occurrence of the off-track signal during the measurement period. Further, the detection sensitivity of the off-track signal detector 11 may be changed by the off-track detection sensitivity controller 14 using the off-track detection sensitivity obtained by the off-track duty measurement unit 13 to bring the detection sensitivity close to a desired off-track detection sensitivity.

Figure 1E:
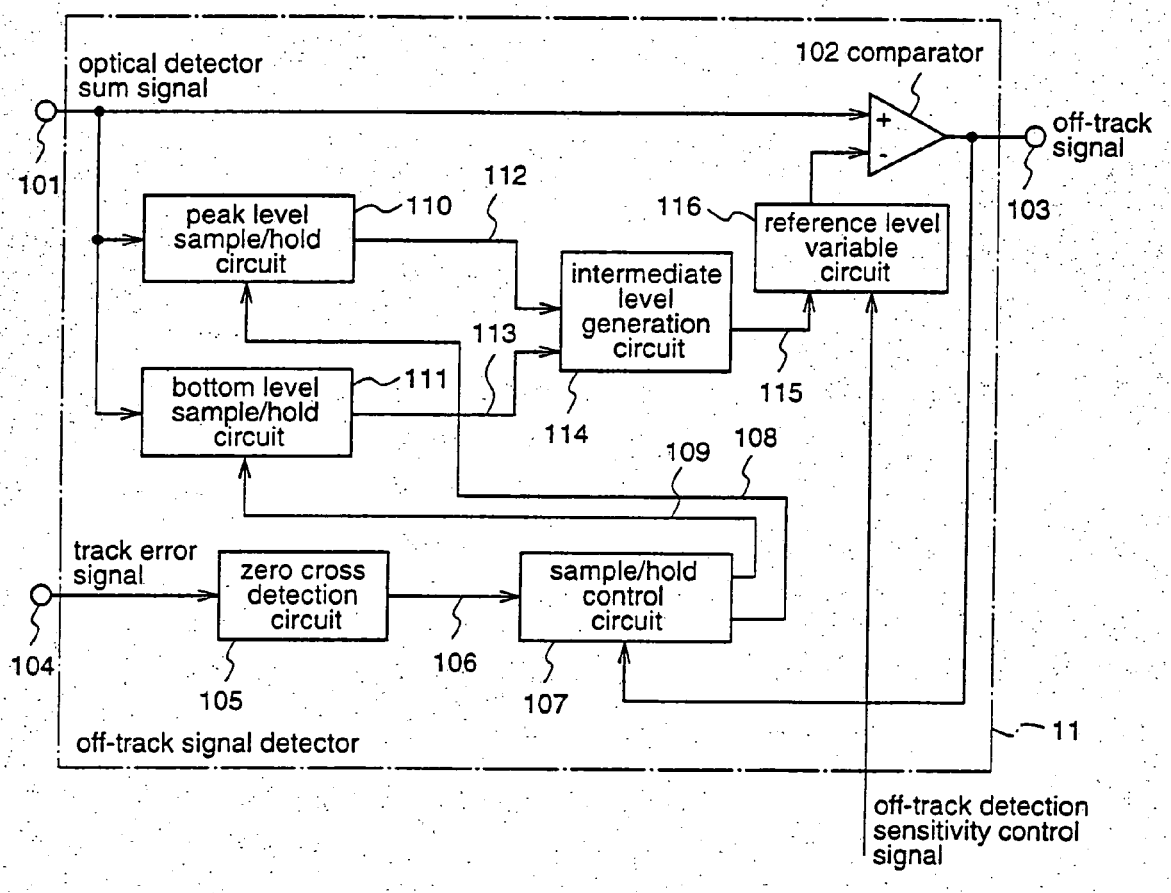
FIG. 1(e) is a block diagram illustrating the construction of an off-track signal detector: shown in FIG. 1(a).
Figure 8:
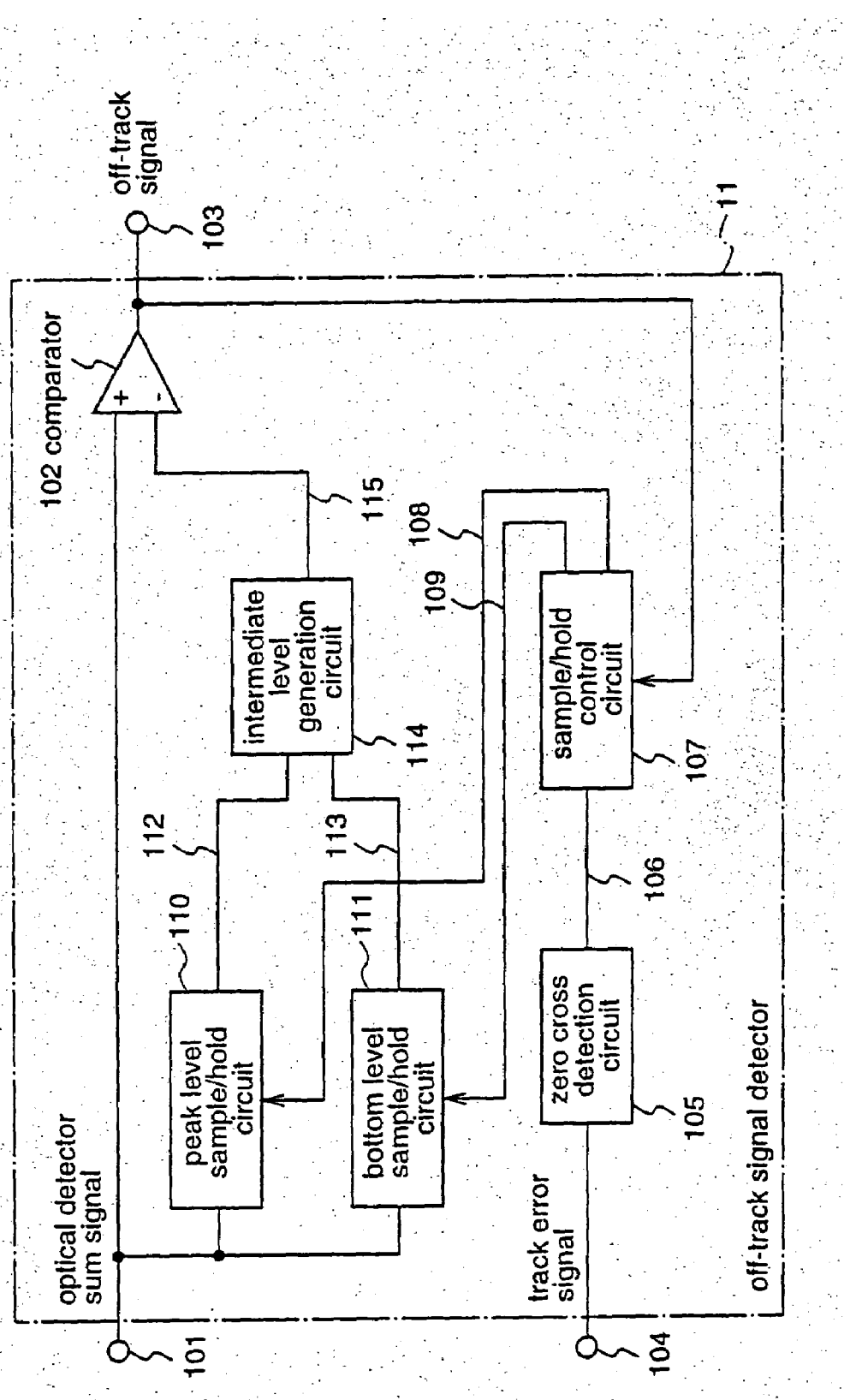
FIG. 8 is a block diagram illustrating the construction of the conventional off-track detection circuit.
Figure 9:
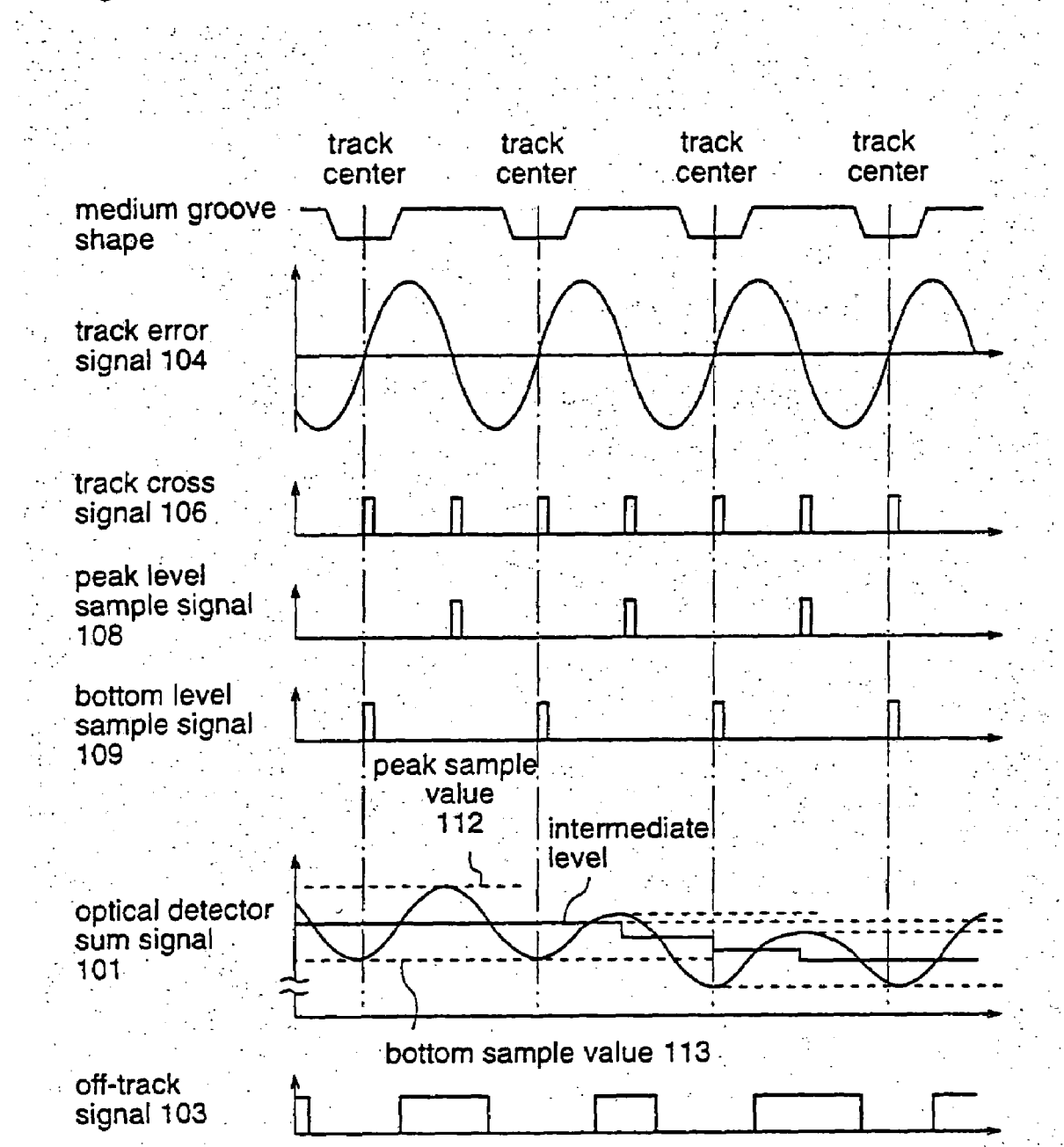
FIG. 9 is a waveform diagram illustrating an off-track signal generation method of the conventional off-track detection circuit.

That is, when using the off-track signal detector 11 of the same construction as shown in FIG. 8, the reference level variable circuit 116 is provided between the output of the intermediate level generation circuit 114 and the inverse-phase input terminal of the comparator 102 as shown in FIG. 1(e), and the intermediate level as the reference level is changed according to the off-track detection sensitivity control signal, thereby making the detection sensitivity of the off-track signal detector 11 changeable.

The above-mentioned operation makes it possible to keep the off-track detection sensitivity constant for every disc, which is difficult in the conventional off-track detection circuit, whereby the off-track detection sensitivity is kept constant for various kinds of discs, especially discs of out standards. Further, even if the off-track detection sensitivity is not perfectly kept constant, it is approximated to a constant sensitivity, resulting in stable system.

Hereinafter, the operator during the off-track detection sensitivity measurement will be described with reference to FIGS. 2(a)-2(c).

Figure 2A:
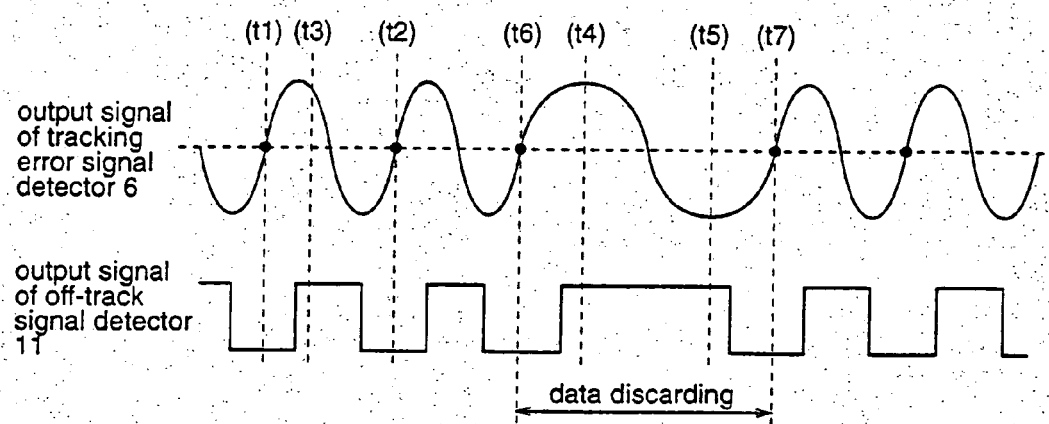
FIG. 2(a) is a waveform diagram showing the operation of the optical disc device having the signal processing device according to the first embodiment in the case where the track cross speed is low.
Figure 2B:
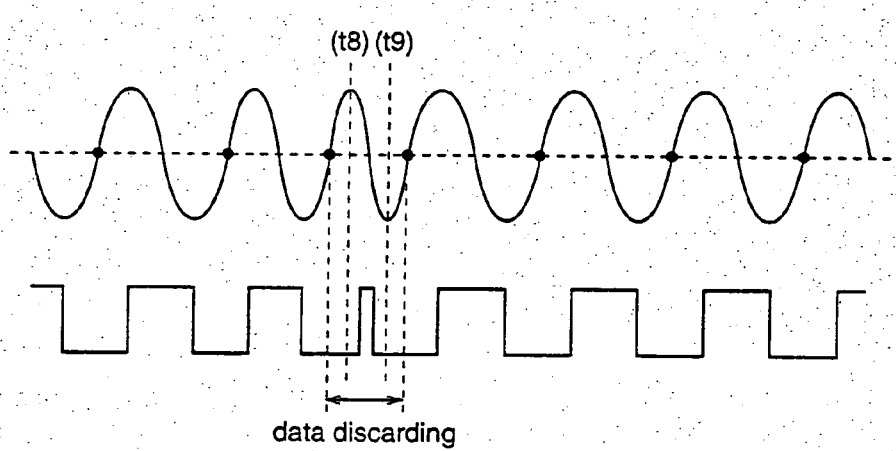
FIG. 2(b) is a waveform diagram showing the operation of the optical disc device having the signal processing device according to the first embodiment in the case where the track cross speed is high.
Figure 2C:
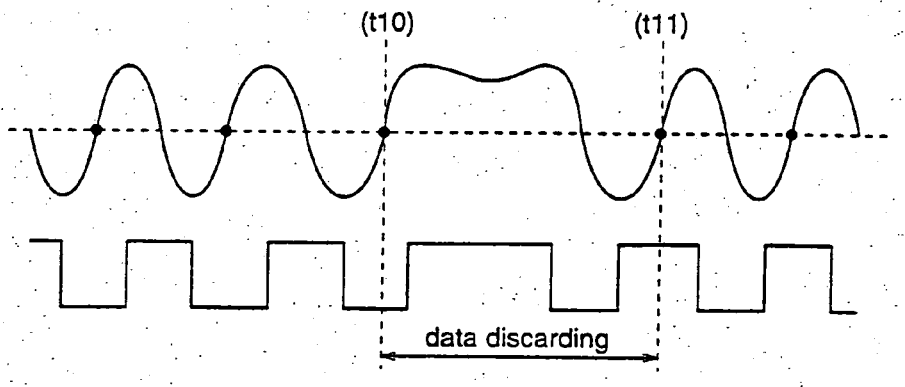
FIG. 2(c) is a waveform diagram showing the operation of the optical disc device having the signal processing device according to the first embodiment in the case where the track cross direction is inverted.

FIGS. 2(a)-2(c) are waveform diagrams illustrating the respective waveforms when performing off-track detection sensitivity measurement according to the first embodiment. In these figures, the abscissa shows time, and the ordinate shows voltage.

To be specific, FIG. 2(a) shows the output signal from the tracking error signal detector 6 and the output signal from the off-track signal detector 11 during off-track detection sensitivity measurement.

When measuring the off-track detection sensitivity, the system controller 100 turns off tracking servo by the tracking controller 7 to make the optical pickup 3 cross the track, and then the tracking error signal indicates the waveform shown in FIG. 2(a). Further, in FIG. 2(a), positions indicated by black dots are track cross positions obtained by the track cross cycle measurement unit 12, and the track cross cycle is measured from the intervals of the black dots. Since, actually, the tracking error signal is affected by noises or the like, a countermeasure such as giving hysteresis to the track cross cycle measurement unit 12 is taken to avoid false detection of track cross positions, thereby correctly detecting the track cross positions.

Since the off-track detection sensitivity is a signal indicating whether the optical pickup 3 is on the track or not, it is basically output at the ratio of 50% when the optical pickup 3 crosses the track as shown in a period from time t1 to time t2. Therefore, during off-track sensitivity measurement, if a measurement start point is set at time t3 (arbitrary time) that is present between time t1 and time t2, a period from time t1 to time t3 is not included in the measured value. In this case, the frequency of occurrence of the off-track signal is highly measured. Conversely, it is easily understood that there may occur cases where the frequency of occurrence of the off-track signal is lowly measured. Furthermore, it is also understood easily that the same can be said of a measurement end point. Accordingly, more accurate off-track detection sensitivity measurement can be carried out by setting the measurement start point and the measurement end point to the same positions as the track cross positions such as time t1 and time t2, respectively. Of course, at least one cycle of track cross must be executed between the measurement start point and the measurement end point, and more stable off-track detection sensitivity measurement can be carried out by setting the measurement period to plural track cross cycles.

Setting of the measurement start point and the measurement end point to the same positions as the track cross positions such as time t1 and time t2, respectively, is carried out by controlling the track cross cycle measurement unit 12. That is, since the track cross cycle measurement unit 12 compares the tracking error signal with a reference value to obtain the track cross cycle, it can recognize where the track starts. Likewise, the track cross cycle measurement unit 12 can also recognize the timing of the track cross, the off-track duty measurement unit 13 may perform measurement on the basis of the recognized track cross cycle and track cross timing.

Further, the off-track signal is generated by the degree of demodulation of the playback signal, i.e., hollows in the playback signal, the sensitivity varies depending on the track cross speed. When the track cross speed is low as shown in a period from time t6 to time t7 in FIG. 2(a), a period from time t4 to time t5 is not detected as an off-track signal but a long period that rises at a point before time t4 and falls at a point after time t5 is detected as shown in FIG. 2(a). Conversely, when the track cross speed is high as shown in FIG. 2(b), the period from time t4 to time t5 is not detected as an off-track signal but a short period that rises at a point after time t8 and falls at a point before time t9 is detected. Accordingly, measurement of off-track detection sensitivity must be carried out considering the above-mentioned matter.

Further, it is also necessary to consider cases where the track cross direction might be inverted as shown in FIG. 2(c). This is caused by such as eccentricity of the disc carrier, and a phase-inverted waveform as shown in a range from time t10 to time t11 is generated. When off-track sensitivity measurement is carried out during this period, the off-track detection sensitivity is highly measured. Likewise, since there is a possibility that the period where the off-track signal is not generated is increased, an error might occur in off-track detection sensitivity measurement. As described above, when the track cross speed is too low or too high, it is desired that off-track sensitivity measurement should be carried out excluding the measured data between the zero-cross points including the corresponding section as indicated by "data discarding" in FIGS. 2(a) to 2(c).

When the track cross direction is inverted, the track cross cycle is increased as shown in FIG. 2(c). Utilizing this phenomenon, this case can be treated as one equivalent to the case where the track cross speed is too low. Accordingly, in an optical disc device other than those having disc discrimination functions such as a DVD player, the optical disc device should be previously set so as to adopt measured data obtained only when the track cross cycle measured by the track cross cycle measurement unit 12 is within a predetermined range, according to the type of the optical disc to be played, whereby reliability in off-track detection sensitivity measurement is increased.

Further, the range of the track cross speed in off-track detection sensitivity measurement is determined so as to include the track cross speed at track jumping. Using the measurement result, the off-track detection sensitivity is lowered by the off-track detection sensitivity controller 14 when the off-track detection sensitivity is high, and the off-track detection sensitivity is enhanced by the off-track detection sensitivity controller 14 when the off-track detection sensitivity is low, whereby the off-track sensitivity at track jumping can be stabilized to secure high stability of track jumping.

Further, as described above, there is a trend that the sensitivity of the off-track signal is lowered when the track cross speed is high while it is enhanced when the track cross speed is low, and therefore, the sensitivity might be changed between track jumping and track tracking. Accordingly, the off-track detection sensitivity controller 14 sets the off-track detection sensitivity at track jumping and the off-track detection sensitivity at track tracking separately on the off-track signal detector 11, whereby more stable system can be constituted in both states of track jumping and track tracing.

As described above, according to the first embodiment, since off-track duty is measured on the basis of the off-track signal and the track cross cycle information that is obtained from the off-track signal by the track cross cycle measurement unit, off-track detection sensitivity can be measured more accurately. Further, since the sensitivity of the off-track signal detector is changed according to the obtained off-track detection sensitivity, the off-track sensitivity can be kept constant with respect to various kinds of discs.

While in this first embodiment the track cross cycle measurement unit provides more accurate off-track sensitivity measurement by setting the track cross positions such as time t1 and time t2 shown in FIG. 2, the track cross detector may be provided before the track cross cycle measurement unit to detect starting timing and end timing of off-track sensitivity measurement, and the detection result may be output to the off-track duty measurement unit.

Embodiment 2

In a second embodiment of the present invention, a defect detector for detecting a defect in a playback signal from an optical disc is added to the above-mentioned first embodiment.

Figure 3A:
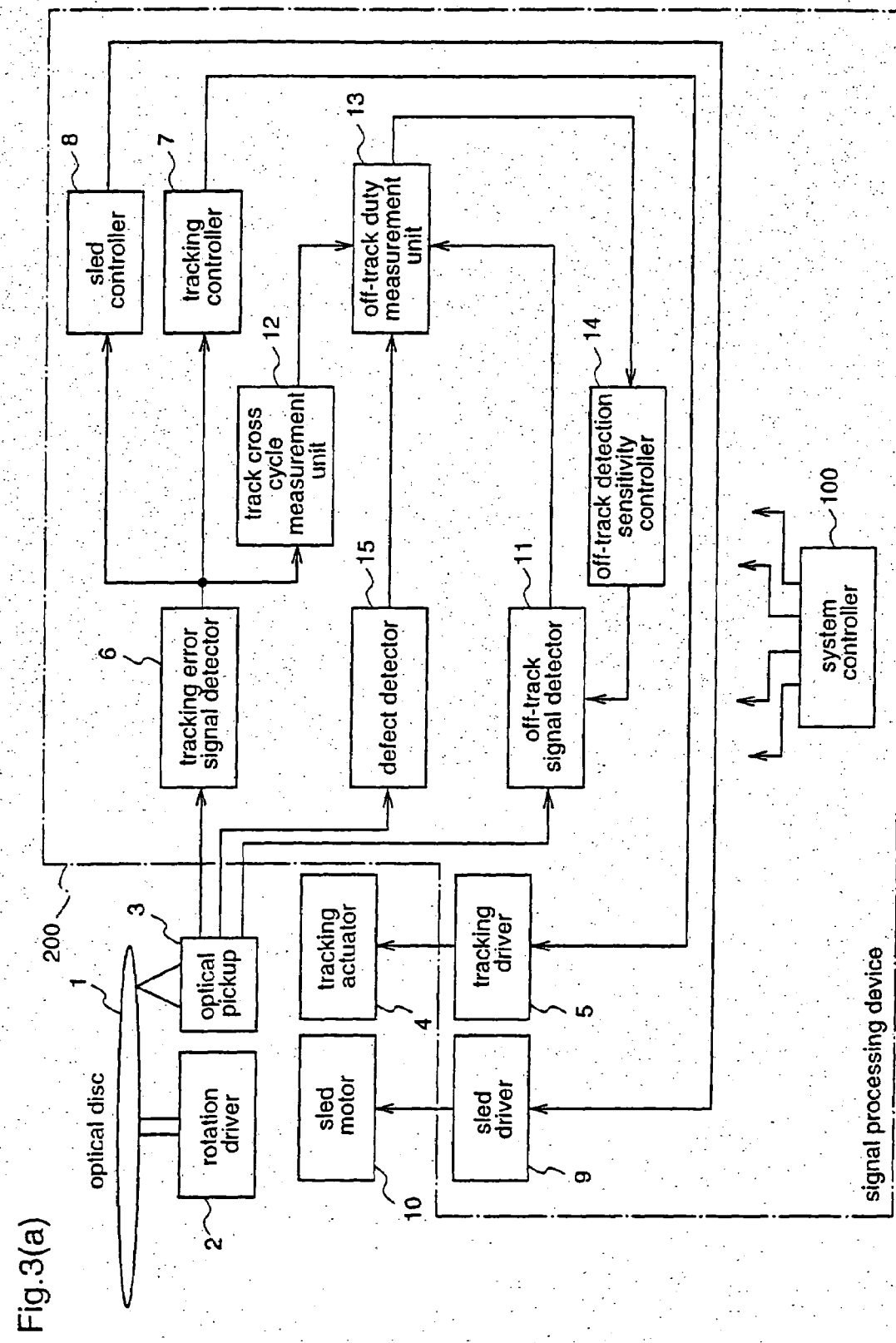
FIG. 3(a) is a block diagram illustrating the construction of an optical disc device having a signal processing device according to a second embodiment of the present invention.
Figure 3B:
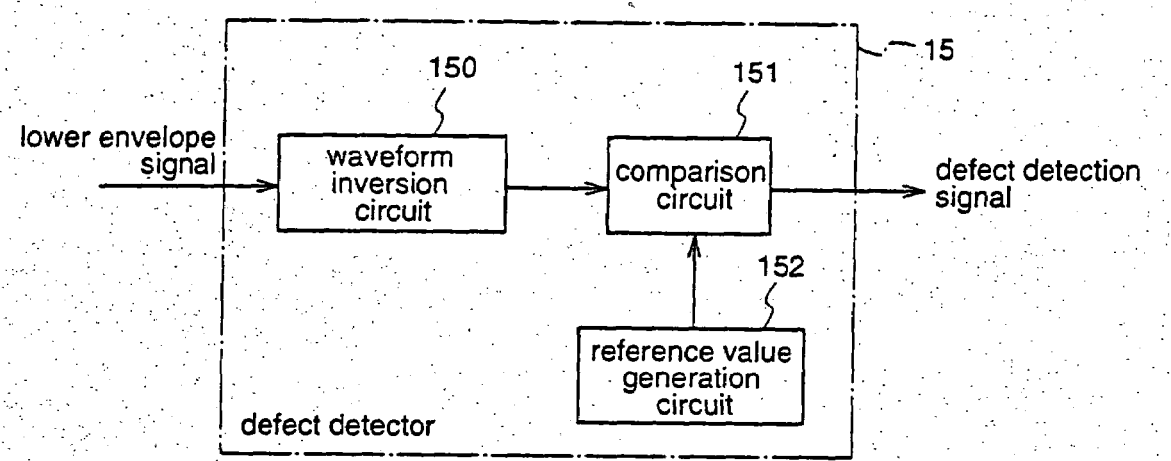
FIG. 3(b) is a block diagram illustrating the construction of the defect detector shown in FIG. 3(a).
Figure 7B:
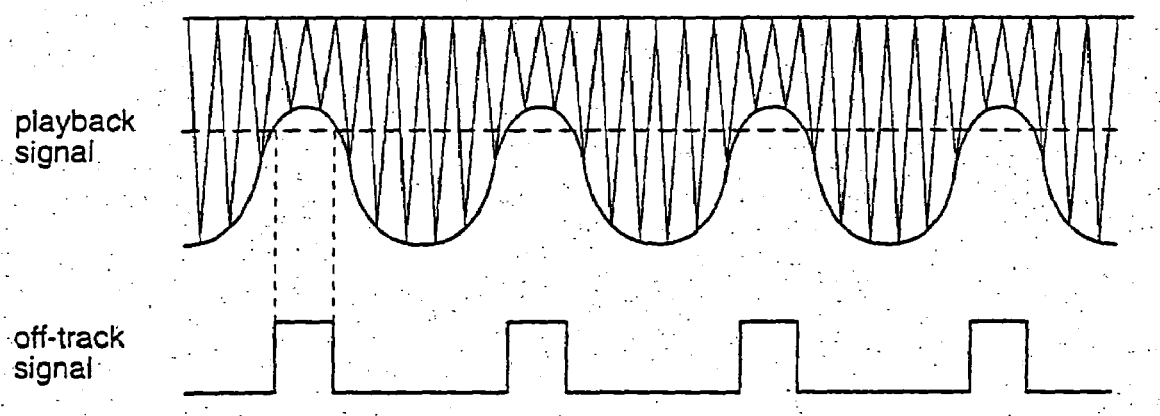
FIG. 7(b) is a waveform diagram illustrating a waveform obtained in the case where the off-track signal generation method of the conventional optical disc device is applied under a condition different from 7(a).

FIG. 3(a) is a block diagram illustrating an optical disc device as a signal processing device having a semiconductor device based on the second embodiment of the present invention. In FIG. 3(a), the same reference numerals as those shown in FIG. 1(a) denote the same or corresponding parts. Reference numeral 200 denotes a signal processing device having a defect detector 15 in addition to the respective blocks included in the signal processing device shown in FIG. 1(a). The defect detector 15 detects a defect in a playback signal on the basis of an information signal obtained from an optical pickup 3. The defect detector 15 compares an upper envelope signal, that is, a waveform obtained by turning upside down a lower envelope signal waveform shown in FIG. 7, with a reference signal, and outputs a defect detection signal when the waveform has a "hollow" at the upper side, that is, when the upper envelope signal of the playback signal has a portion that is convex toward the lower side of the figure. FIG. 3(b) shows an example of construction of the defect detector 15. In FIG. 3(b), reference numeral 150 denotes a waveform inversion circuit for turning upside down the waveform of the lower envelope signal, numeral 152 denotes a reference value generation circuit for generating a reference value, and numeral 151 denotes a comparison circuit for comparing the upside down turned lower envelope signal with the reference value generated by the reference value generation circuit 152, and outputting a defect detection signal in a section where the lower envelope signal is lower than the reference value.

Figure 3C:
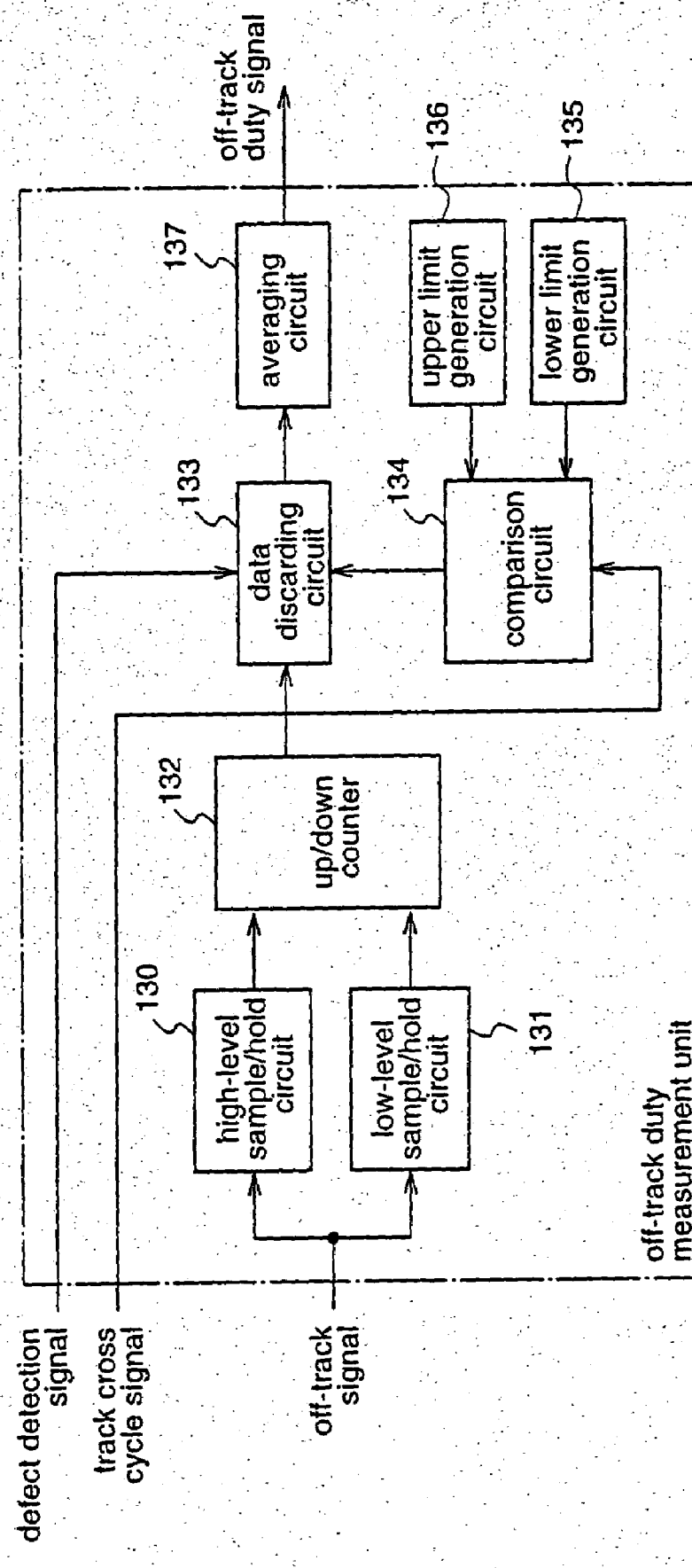
FIG. 3(c) is a block diagram illustrating the construction of an off-track duty measurement unit shown in FIG. 3(a).

FIG. 3(c) shows the construction of a off-track duty measurement unit 13 according to the second embodiment, and it is identical to the off-track duty measurement unit 13 shown in FIG. 1(c) except that the data discarding circuit 133 is provided with the defect detection signal as a control signal.

Next, the operation of the second embodiment will be described. The operation of the second embodiment also has two modes, i.e., normal operation and off-track duty measurement as in the first embodiment. Hereinafter, the operation during off-track duty measurement, which is different from that of the first embodiment, will be described.

As described above, during off-track sensitivity measurement, the playback signal (including the off-track signal) and the tracking error signal must be normally outputted. However, when the playback signal is dropped or degraded due to flaws or stains on the disc surface, reliability of measured data might be degraded.

Figure 4A:
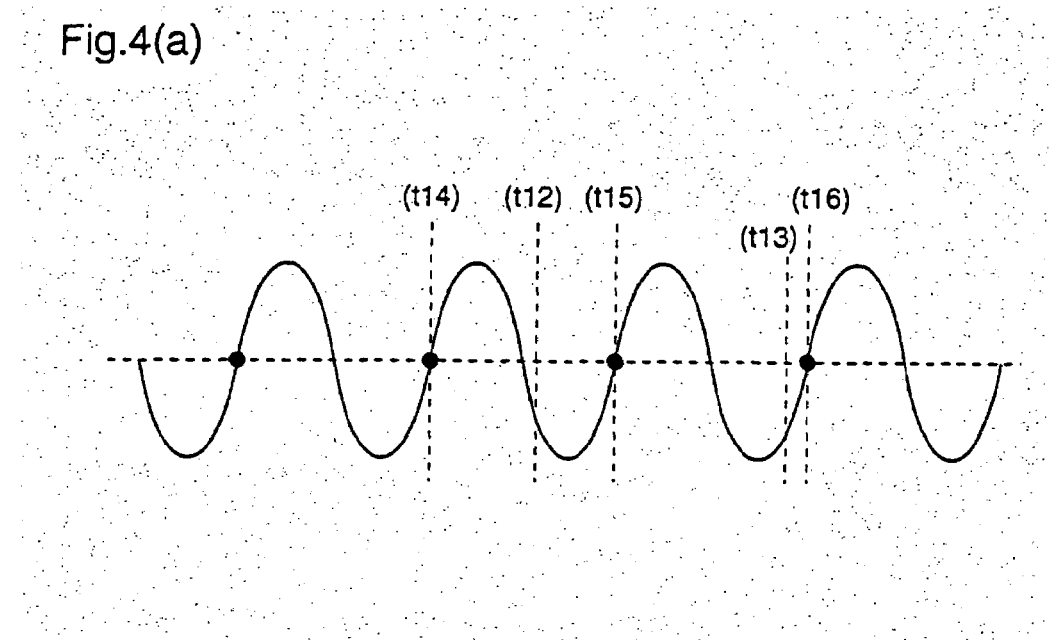
FIG. 4(a) is a waveform diagram for explaining the operation of the optical disc device having the signal processing device according to the second embodiment, illustrating an output signal from a tracking error signal detector during off-track detection sensitivity measurement.
Figure 4B:
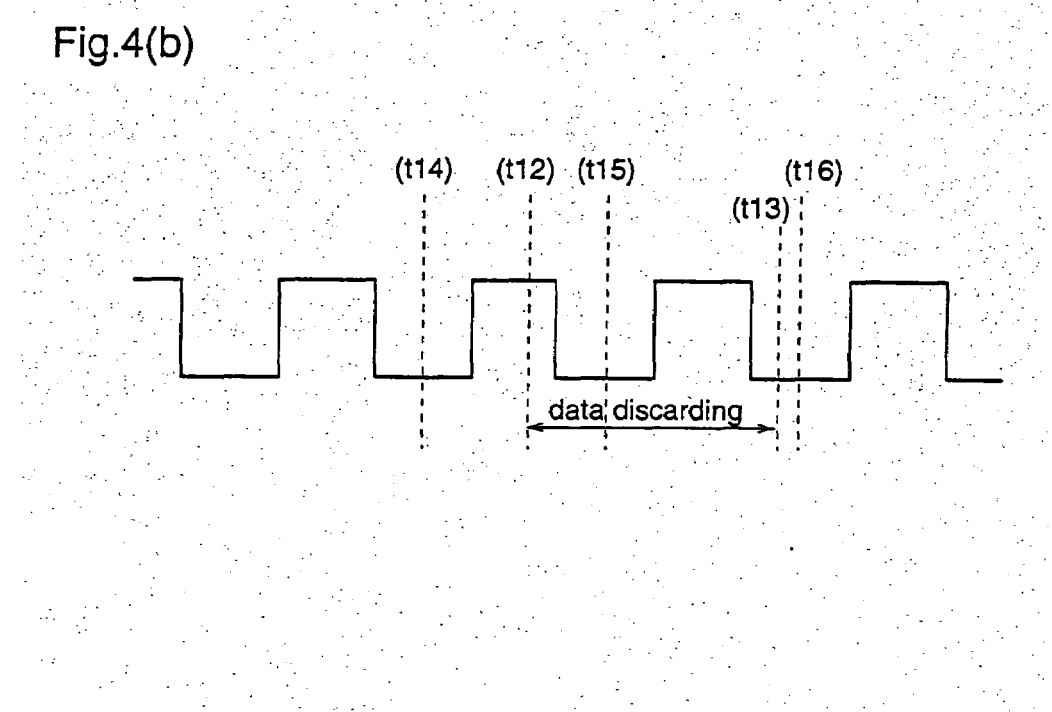
FIG. 4(b) is a waveform diagram illustrating an output signal from an off-track signal detector.
Figure 4C:
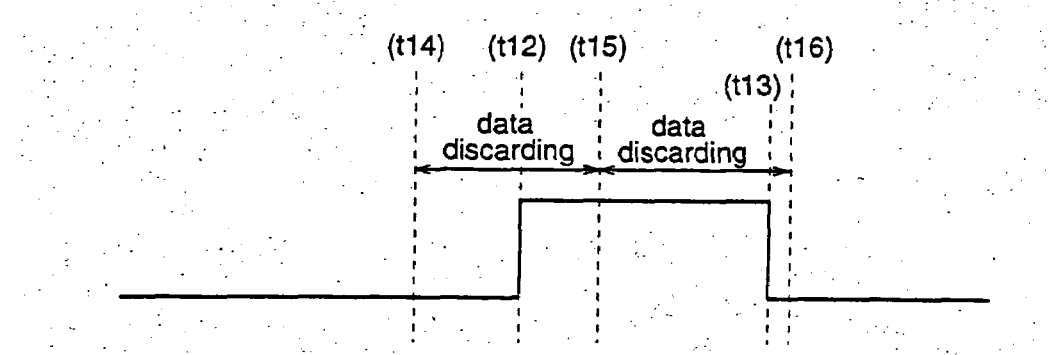
FIG. 4(c) is a waveform diagram illustrating an output signal from a defect detector.

FIGS. 4(a)-4(c) are waveform diagrams illustrating the respective waveforms when off-track detection sensitivity measurement is carried out, for explaining the operating principle of the second embodiment. In these, the abscissa shows time, and the ordinate shows voltage.

More specifically, FIG. 4(a) shows an output signal from the tracking error signal detector 6 during off-track detection sensitivity measurement, FIG. 4(b) shows an output signal from the off-track signal detector 11, and FIG. 4(c) shows an output signal from the defect detector 15.

When a defect detection signal as an output signal from the defect detector 15 is generated during a period from time t12 to time t13 in off-track sensitivity measurement, measured data corresponding to the period where the defect detection signal is generated, that is, from time t12 to time t13, are discarded. Thereby, even when the optical pickup 3 passes the defect area during off-track sensitivity measurement, off-track sensitivity measurement can be carried out without degrading reliability of the measured data.

Further, when a defect is detected within the off-track cross cycle, not only the measured data during the detection but also the data in the track cross cycles from time t14 to time t15 and from time t15 to time t16 are discarded. Thereby, the measured data in the period from time t14 to time t12 as well as the measured data in the period from time t13 to time t16 are also discarded, and therefore, error components during the track cross cycle are not measured as described for the first embodiment, and furthermore, reliability of off-track detection sensitivity measurement can be increased.

As described above, the second embodiment of the present invention is provided with the defect detector for detecting a defect in the playback signal. When a defect is detected by the defect detector, utilization of the measurement result of the off-track duty measurement unit is restricted, and the measured data are discarded. Therefore, error components during the track cross cycle can be removed from the measurement result, resulting in further increase in reliability of off-track detection sensitivity measurement.

Embodiment 3

A third embodiment of the present invention has the same block constituents as those described for the first embodiment, but the track cross cycle from the track cross cycle measurement unit is given not to the off-track duty measurement unit but to the tracking controller and the sled controller, and the off-track signal from the off-track signal detector is given to the tracking controller.

Figure 5:
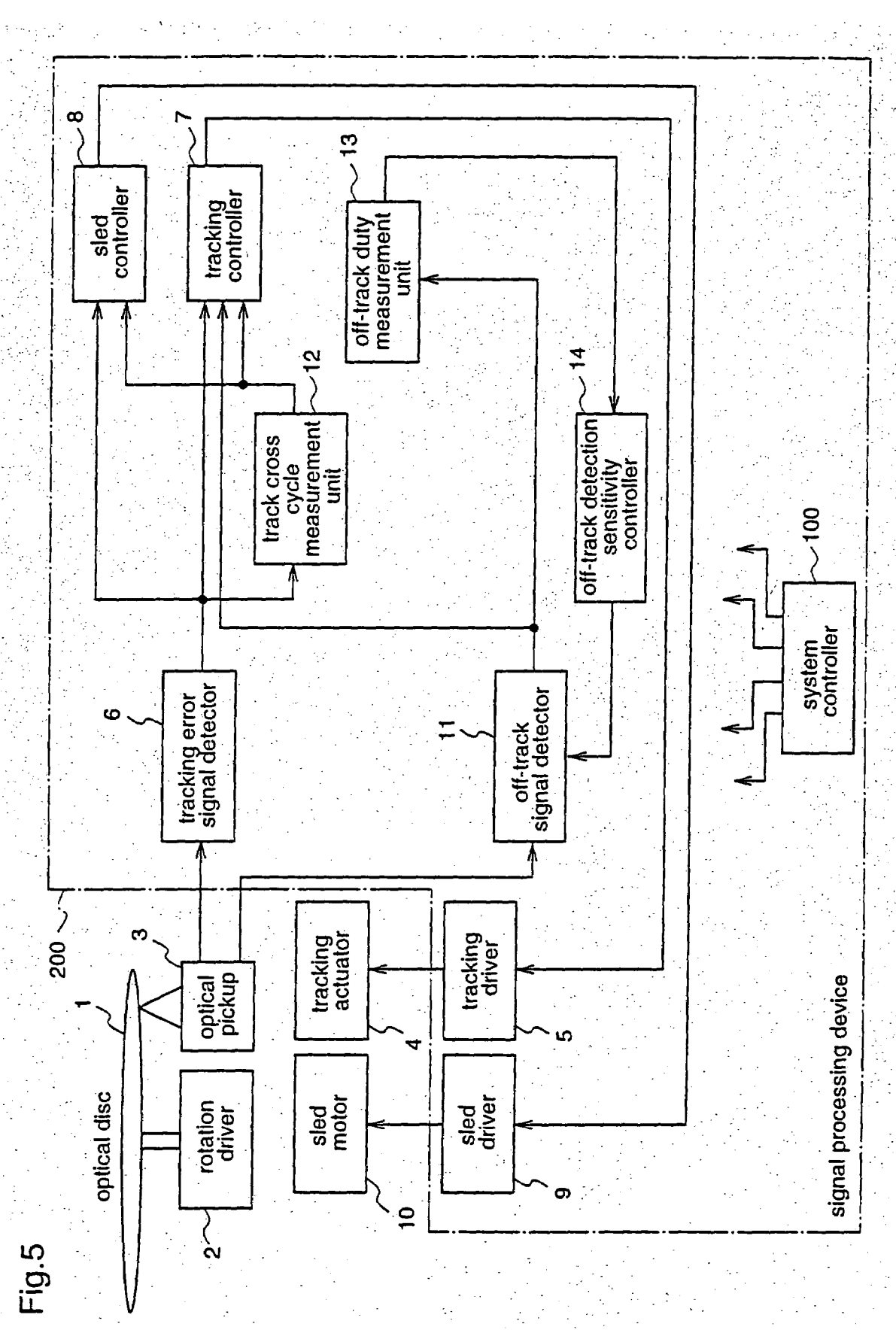
FIG. 5 is a block diagram illustrating the construction of an optical disc device having a signal processing device according to a third embodiment of the present invention.

FIG. 5 is a block diagram illustrating an optical disc device as a signal processing device having a semiconductor device based on the third embodiment of the present invention. In FIG. 5, reference numeral 1 denotes an optical disc on which an information signal is recorded on spiral or concentric tracks; reference numeral 2 denotes a rotation unit for rotating the optical disc 1; numeral 3 denotes an optical pickup as a playback unit for creating a light spot by focusing a light beam on an information surface of the optical disc, and detecting a reflected light beam to output various kinds of information; numeral 4 denotes a tracking actuator for moving the optical pickup 3 in the radial direction of the optical disc 1; numeral 5 denotes a tracking driver for driving the tracking actuator 4; numeral 6 denotes a tracking error signal detector for generating a tracking error signal indicating a deviation of the optical pickup 3 from the track, on the basis of the output of the optical pickup 3; numeral 7 denotes a tracking controller for controlling the tracking drive unit 5 on the basis of the output of the tracking error signal detector 6 or an off-track signal detector 11; numeral 8 denotes a sled controller for controlling a sled driver 9 on the basis of the output of the tracking error signal detector 6; numeral 9 denotes a sled driver for driving a sled motor 10 on the basis of the output of the sled controller 8; numeral 10 denotes a sled motor for moving the optical pickup 3 on the basis of the output of the sled driver 9; numeral 11 denotes an off-track signal detector for detecting an off-track signal indicating the state where the optical pickup 3 is off the track, on the basis of the output of the optical pickup 3; numeral 12 denotes a track cross cycle measurement unit for measuring a track cross cycle on the basis of a tracking error signal from the tracking error signal detector 6; numeral 13 denotes an off-track duty measurement unit for measuring an off-track detection sensitivity on the basis of the information obtained by the off-track signal detector 11; and reference numeral 14 denotes an off-track detection sensitivity controller for controlling the off-track sensitivity on the basis of the information obtained by the off-track duty measurement unit 13, which controls the detection sensitivity of the off-track signal detector 11.

Next, the operation of the third embodiment will be described. The operation of the third embodiment also has two modes, i.e., normal operation and off-track duty measurement as in the first embodiment. Hereinafter, the operation during off-track duty measurement, which is different from that of the first embodiment, will be described.

The off-track signal at track cross is monitored during off-track sensitivity measurement. Therefore, in the state where track eccentricity hardly exists, track cross hardly occurs, and the measurement time increases to obtain an accurate measured value in off-track sensitivity measurement, or the measured value varies. So, when performing off-track detection sensitivity measurement, it is necessary to make track cross occur with stability using the tracking controller 7 and the sled controller 8.

Initially, the system controller 100 turns off tracking servo by using the tracking controller 7, and stops the sled motor 10 by using the sled controller 8. Next, the system controller 100 adds a disturbance from the tracking controller 7 to the tracking driver 5 so that the optical pickup 3 vibrates in the direction of the radius of the disc. As for a disturbance wave in this case, such as a sine wave or a triangle wave can be adopted. However, any wave may be used as long as the optical pickup 3 crosses the track.

As described above, by vibrating the optical pickup 3 in the direction of the radius of the disc, track cross occurs with stability, and off-track sensitivity measurement is normally carried out, or the measurement time can be reduced.

The same effects as mentioned above can be achieved by adding a disturbance from the sled controller 8 to the sled driver 9 so as to vibrate the optical pickup 3 in the direction of the radius of the disc, without using the tracking controller 7.

Further, the same effects as mentioned above can also be expected by performing off-track detection sensitivity measurement while driving (moving) the optical pickup 3 in either direction to the sled driver 9 by the sled controller 8.

Furthermore, when the track cross speed is kept constant by controlling the output value of the sled controller 8 according to the output of the track cross cycle measurement unit 12, the frequencies of the tracking error signal and the off-track signal which are obtained during off-track sensitivity measurement become constant, whereby off-track sensitivity at the specific frequency can be measured, resulting in more stable off-track detection sensitivity measurement.

Furthermore, since the outputs of the off-track signal detector 11 and the track cross cycle measurement unit 12 are input to the tracking controller 7, the driving force of tracking can be controlled by comparing the track cross cycle of the optical pickup 3 with a cycle that is previously set in the tracking controller 7.

Furthermore, since the output of the track cross cycle measurement unit 12 is input to the sled controller 8, the driving force of sled can be controlled by comparing the track cross cycle of the optical pickup 3 with a cycle that is previously set in the sled controller 8.

The above-mentioned effects enable speed control. To be specific, since the tracking error signal and the off-track signal have a phase difference of 90°, the tracking controller 7 can determine the moving direction of the optical pickup 3 from the phases. Further, the tracking controller 7 and the sled controller 8 can determine the moving speed of the optical pickup 3 on the basis of the tracking error signal and the track cross cycle (the cycle of the off-track signal is also available). In this way, since the moving direction and moving speed of the optical pickup 3 can be determined, speed control can be carried out by accelerating or decelerating the optical pickup 3 until desired direction and speed are achieved.

As described above, according to the third embodiment, it is possible to make track cross occur with stability by adding a disturbance from the tracking controller 7 to the tracking driver 5 so as to move or vibrate the optical pickup, and therefore, even a disc on which track eccentricity hardly exists can be subjected to off-track detection sensitivity measurement. Further, since the outputs of the off-track signal detector 11 and the track cross cycle measurement unit 12 are input to the tracking controller 7 while the output of the track cross cycle measurement unit 12 is input to the sled controller 8, speed control when driving the optical pickup 3 is possible.

While in this third embodiment "hollows" in the playback signal are utilized when generating an off-track signal, it is needless to say that an off-track signal generated by another method such as a phase difference method may also be subjected to measurement and adjustment of off-track detection sensitivity using similar technique.

Further, in the third embodiment, the measurement accuracy is enhanced by moving or vibrating the optical pickup 3 or the sled, and the track cross cycle information is not necessary for realizing it, and therefore, the output of the track cross cycle measurement unit 12 is not input to the off-track duty measurement unit 13. However, when off-track detection sensitivity measurement is required, the track cross signal and the track cross cycle information which are obtained as the outputs of the track cross cycle measurement unit 12 may be input to the off-track duty measurement unit 13 as in the first embodiment.

Furthermore, in the first to third embodiments, the optical disc device is constituted by hardware. However, the circuit blocks other than the mechanism parts of the rotation unit 2, the optical pickup 3, the tracking actuator 4, and the sled motor 10, i.e., the signal processing device 200 shown in FIG. 1(*a*), 3(*a*), or 5 may be implemented by one or plural semiconductor devices, or the signal processing device may be implemented by software.

Further, while in the first to third embodiments off-track duty measurement is described after describing normal operation, off-track duty measurement can be carried out at a desired point of time such as when loading a disc onto the disc device.

Furthermore, while the first to third embodiments have been described as those used in an optical disc device that uses an optical disc as a recording medium, these embodiments may be used in a disc device that uses a magneto-optical disc, a magnetic disc, and the like, with the same effects as described above.

As described above, in the present invention, off-track signal detection sensitivity of an off-track signal detector is measured, and the sensitivity of the off-track signal detector is controlled according to the measurement result. Therefore, the off-track signal detection sensitivity can be kept constant for each disc, and playback of various discs out of standards can be carried out with stability.

What is claimed is:

1. A signal processing device comprising:
    a track cross cycle measurement unit for receiving a tracking error signal showing a degree of deviation of a playback unit for playing data recorded on a recording medium from a track formed on the recording medium, and measuring a track cross cycle that is a cycle with which the playback unit crosses the track, on the basis of the tracking error signal;
    an off-track signal detector for detecting an off-track signal indicating that the playback unit is off the track;
    an off-track duty measurement unit outputting an off-track duty signal on the basis of the off-track signal;
    a tracking driver for moving the playback unit for playing the data recorded on the recording medium in the direction of the radius of the recording medium;
    a sled driver for moving the playback unit;
    a sled controller for controlling said sled driver;
    a system controller, said system controller controlling the tracking driver and the sled driver, and measuring the off-track detection sensitivity while moving or vibrating the playback unit in the direction in which the playback unit crosses the track;
    wherein said track cross cycle measurement unit gives the measured track cross cycle to the tracking driver and the sled controller.

2. A signal processing device comprising:
    a track cross cycle measurement unit for receiving a tracking error signal showing a degree of deviation of a playback unit for playing data recorded on a recording medium from a track formed on the recording medium, and measuring a track cross cycle that is a cycle with which the playback unit crosses the track, on the basis of the tracking error signal;
    an off-track signal detector for detecting an off-track signal indicating that the playback unit is off the track;
    an off-track duty measurement unit outputting an off-track duty signal on the basis of the off-track signal;
    a tracking driver for moving the playback unit for playing the data recorded on the recording medium in the direction of the radius of the recording medium;
    a sled driver for moving the playback unit;
    a sled controller for controlling said sled driver;
    a system controller, said system controller controlling the tracking driver and the sled driver, and measuring the off-track detection sensitivity while moving or vibrating the playback unit in the direction in which the playback unit crosses the track, wherein said system controller performs control so that the track cross cycle becomes a predetermined range; and wherein said track cross cycle measurement unit gives the measured track cross cycle to the tracking driver and the sled controller.

\* \* \* \* \*